US011866982B2

(12) United States Patent
Tanaka et al.

(10) Patent No.: US 11,866,982 B2
(45) Date of Patent: Jan. 9, 2024

(54) COOKER

(71) Applicant: SHARP KABUSHIKI KAISHA, Osaka (JP)

(72) Inventors: Minoru Tanaka, Sakai (JP); Katsumi Ishifuro, Sakai (JP); Toshiro Meiji, Sakai (JP); Junichi Takeuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 845 days.

(21) Appl. No.: 16/962,845

(22) PCT Filed: Sep. 14, 2018

(86) PCT No.: PCT/JP2018/034177

§ 371 (c)(1),
(2) Date: Jul. 17, 2020

(87) PCT Pub. No.: WO2019/142395

PCT Pub. Date: Jul. 25, 2019

(65) Prior Publication Data

US 2021/0164284 A1 Jun. 3, 2021

(30) Foreign Application Priority Data

Jan. 19, 2018 (JP) ................................ 2018-007454

(51) Int. Cl.
*E05F 15/73* (2015.01)
*F24C 15/02* (2006.01)
*H05B 6/64* (2006.01)

(52) U.S. Cl.
CPC .............. *E05F 15/73* (2015.01); *F24C 15/02* (2013.01); *H05B 6/6435* (2013.01); *E05Y 2900/308* (2013.01)

(58) Field of Classification Search
CPC ... E05F 15/73; H05B 6/6435; E05Y 2900/308
USPC .......................................................... 126/190
See application file for complete search history.

(56) References Cited

U.S. PATENT DOCUMENTS

2015/0157184 A1* 6/2015 Alexander .......... A47L 15/4261 49/506
2017/0074006 A1* 3/2017 Patel ....................... E05B 81/77

FOREIGN PATENT DOCUMENTS

| | | | |
|---|---|---|---|
| JP | 656-38216 | A | 4/1981 |
| JP | S58-99808 | A | 6/1983 |
| JP | H07-12805 | A | 1/1995 |
| JP | 2000-249349 | A | 9/2000 |
| JP | 2004-264210 | A | 9/2004 |
| JP | 5345166 | B2 | 11/2013 |

* cited by examiner

*Primary Examiner* — Vivek K Shirsat
(74) *Attorney, Agent, or Firm* — ScienBiziP, P.C.

(57) ABSTRACT

A cooker with a door includes: a proximity sensor configured to detect presence or absence of an object in proximity to the cooker; and a door opening controller configured to control the door to open and close on a detection signal from the proximity sensor, wherein the door opening controller opens the door when receiving the detection signal from the proximity sensor twice or more within a predetermined time period, the detection signal indicating the presence of the object.

4 Claims, 6 Drawing Sheets

COOKER

TECHNICAL FIELD

An aspect of the present invention relates to cookers and, in particular, a cooker with a door.

The present application claims priority to Japanese Patent Application No. 2018-007475, filed on Jan. 19, 2018, the contents of which are incorporated herein by reference in its entirety.

BACKGROUND ART

A typical cooker such as an oven installed in the kitchen has a door disposed to an opening, of the cooker, through which an object to be cooked is loaded and unloaded. A cooker of this type requires a user to either manually open and close the door, or operate, for example, an open-close button to open and close the door. Such a door poses a problem of poor usability for the user.

For example, Patent Document 1 discloses a heating cooker with improved usability for a user, since the door of the heating cooker automatically opens when the user having a cooking container with him or her approaches the heating cooker.

CITATION LIST

Patent Literature

Patent Document 1: Japanese Patent No. 5345166 (registered on Aug. 23, 2013).

SUMMARY OF INVENTION

Technical Problem

The heating cooker disclosed in Patent Document 1 handles non-contact communication between the heating cooker itself and the cooking container, so that the door automatically opens when the user having the cooking container with him or her comes near the heating cooker. If the user has no cooking container with him or her for handling the non-contact communication, the door will not open even if the user approaches the heating cooker. Moreover, if the user has the cooking container for non-contact communication with him or her, the door will inevitably open when the user simply approaches the heating cooker regardless of his or her intension even if the user has no intention to load the cooking container into the heating cooker.

An aspect of the present invention is to provide a cooker including a door which keeps from opening unless a user intends to open the door.

Solution to Problem

In order to solve the above problems, a cooker according to an aspect of the present invention is directed to a cooker with a door. The cooker includes: a proximity sensor detecting presence or absence of an object in proximity to the cooker; and a door opening controller controlling the door to open and close on a detection signal from the proximity sensor, wherein the door opening controller opens the door when receiving the detection signal from the proximity sensor twice or more within a predetermined time period, the detection signal indicating the presence of the object.

Advantageous Effects of Invention

An aspect of the present invention makes it possible to provide a cooker whose door is kept from opening unless the user intends to open the door.

DESCRIPTION OF EMBODIMENTS

First Embodiment

Described below in detail is a first embodiment of the present invention. This embodiment explains an example in which a cooker of the present invention is applied to a heating cooker.

Outline of Heating Cooker

Figure 1:
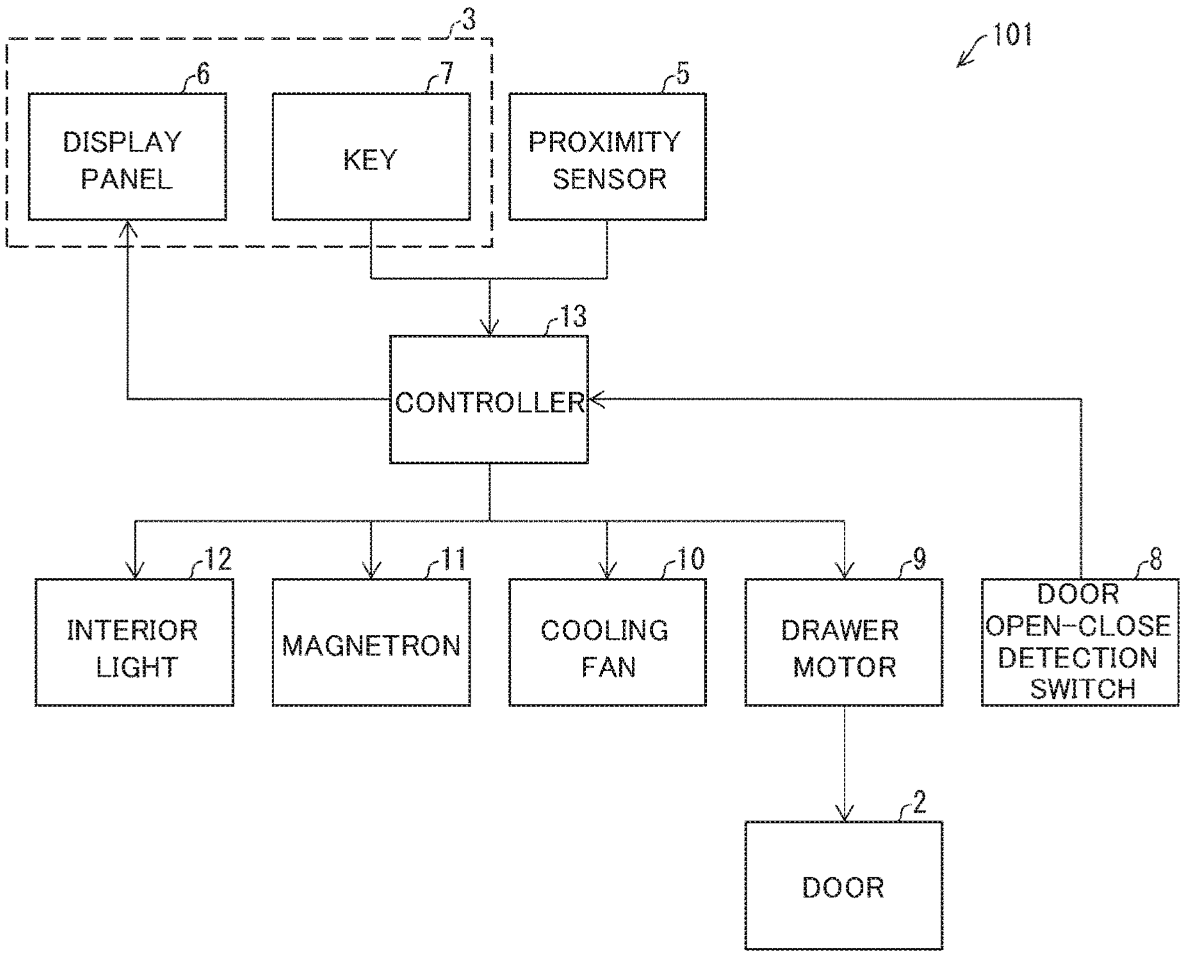
FIG. 1 is a functional block diagram of a cooker according to a first embodiment of the present invention.
Figure 2:
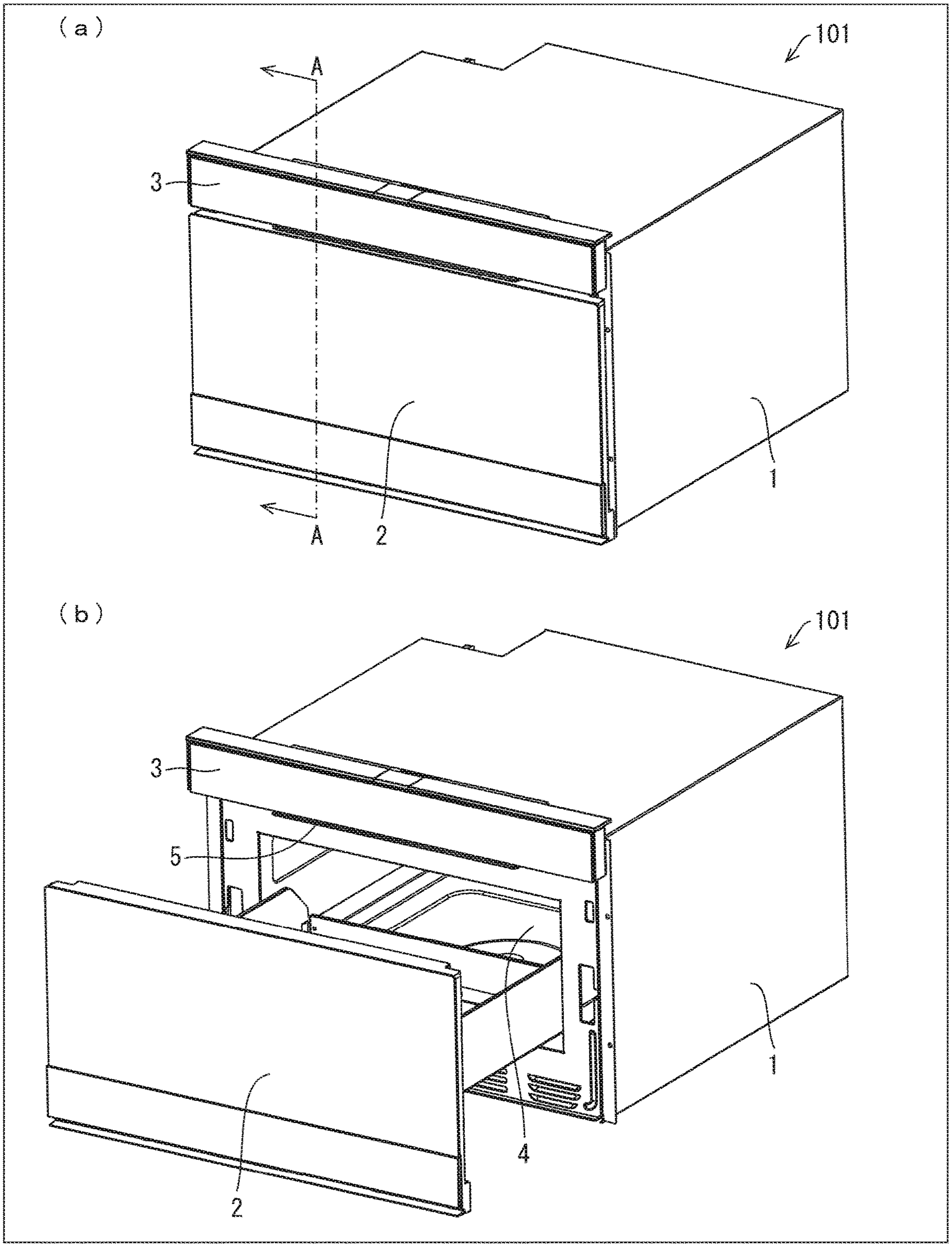
FIG. 2 is a perspective view illustrating appearances of the cooker in FIG. 1. An illustration (a) shows the cooker with the door closed, and an illustration (b) shows the cooker with the door open.

FIG. 2 is a perspective view of a heating cooker 101 of this embodiment. In FIG. 2, an illustration (a) shows a door 2 closed, and an illustration (b) shows the door 2 open. The heating cooker 101 includes a magnetron 11 (FIG. 1) which generates a microwave and allows the heating cooker 101 to cook as a microwave oven does. The heating cooker 101 may also function, for example, as a conventional oven as well as a microwave oven.

As illustrated in FIG. 2, the heating cooker 101 includes a casing 1 shaped into a cuboid, the door 2, and an operation panel 3. A space defined by the casing 1 acts as a heating cavity 4 for accommodating an article to be heated. Note that the magnetron 11 (FIG. 1) is disposed inside the casing 1 (e.g., across the heating cavity 4 from the door 2).

The door 2 is a drawer pulled out of the casing 1 as shown in the illustration (b) in FIG. 2, so that the heating cavity 4 is open. The door 2 is driven by a drawer motor 9 (FIG. 1) to open and close the opening of the heating cavity 4. The drawer motor 9 will be described later.

Disposed near the operation panel 3 is a proximity sensor 5 detecting an object found in front of, and approaching, the heating cooker 101. Note that the proximity sensor 5 may be disposed to any given place as far as the place is on the front face of the heating cooker 101. In order for the proximity sensor 5 to appropriately function, the proximity sensor 5 may preferably be disposed not on the door 2 that is movable, but near the operation panel 3 secured to the heating cooker 101.

Functional Blocks

FIG. 1 is a functional block diagram of the heating cooker 101.

As illustrated in FIG. 1, the heating cooker 101 includes a controller (a door opening controller) 13 and constituent features around the controller 13. Disposed to the signal input of the controller 13 are such constituent features as the proximity sensor 5 and a key 7 of the operation panel 3, and a door open-close detection switch 8. Disposed to the signal output of the controller 13 are such constituent features as a display panel 6 of the operation panel 3, the drawer motor 9, a cooling fan 10, the magnetron 11, and an interior light 12. Note that the controller 13 is a central processing unit (CPU), and includes a timer to measure (timer measuring) a time period for open control of the door 2 to be described later.

The display panel 6 is a liquid crystal panel, and displays items selected by the user. Examples of the items to be displayed include a menu, a setting, and reheating. The display panel 6 includes a single screen displaying multiple items. On the screen, one item selected from among the items is presented in a manner that the letters and background of the one item are displayed in reverse video (highlighted) out of those of the other items. Moreover, if the items do not fit on a single screen, the display panel 6 displays the items across multiple screens to be switched therebetween. Information to be displayed on the display panel 6 is sent from the controller 13.

The key 7 receives an operation of the user. Specifically, the key 7 has functions to receive instructions (i) to start and stop cooking, and (ii) to determine the items displayed on the display panel 6 to be determined by the user. The key 7 may include multiple physical buttons each corresponding to one of functions. Moreover, if the display panel 6 is included in a touch panel, the key 7 may display multiple physical buttons each corresponding to one of the functions. A signal of a key operation received by the key 7 is sent to the controller 13.

The door open-close detection switch 8 detects opening and closing of the door 2. A signal detected by the door open-close detection switch 8 is sent to the controller 13.

The drawer motor 9 is a driving motor to open and close the door 2. The drawer motor 9 is controlled to be driven on a driving instruction from the controller 13.

The cooling fan 10 cools members susceptible to influence of heat, such as a circuit board included in the heating cooker 101. The cooling fan 10 is controlled to be driven on a driving instruction from the controller 13.

The magnetron 11 is a device to generate a high-frequency radio wave. The high-frequency wave generated by the magnetron 11 travels through a not-shown waveguide to be guided into the heating cavity 4, and heats the article to be heated. The magnetron 11 is controlled to be driven on a driving signal from the controller 13.

The interior light 12 illuminates the interior of the heating cavity 4. The interior light 12 is driven on a driving signal from the controller 13.

As can be seen, the display panel 6, the drawer motor 9, the cooling fan 10, the magnetron 11, and the interior light 12 are controlled to be driven by the controller 13.

That is, the controller 13 causes the display panel 6 to display information based on the control that the key 7 receives.

The controller 13 controls a turn ON and a turn OFF of the interior light 12 on a detection signal (an ON/OFF signal) from the door open-close detection switch 8. Specifically, when receiving an ON detection signal (i.e., a signal indicating that the door 2 is open) from the door open-close detection switch 8, the controller 13 outputs a signal to instruct the interior light 12 to turn ON. Furthermore, when receiving an OFF detection signal (i.e., a signal indicating that the door 2 is closed) from the door open-close detection switch 8, the controller 13 outputs a signal to instruct the interior light 12 to turn OFF. In other words, the interior light 12 turns ON when the door 2 is open, and turns OFF when the door 2 is closed.

The controller 13 controls drive of the drawer motor 9 on the detection signal of the proximity sensor 5. That is, the controller 13 controls the opening of the door 2 on the detection signal of the proximity sensor 5. The open control of the door 2 will be described later in detail.

When the heating cooker 101 is driven, the controller 13 drives the cooling fan 10. Hence, the cooling fan 10 can cool members susceptible to influence of heat, such as a circuit board included in the heating cooker 101.

Note that, while the heating cooker 101 is driven, the cooling fan 10 does not have to be always driven. Alternatively, the cooling fan 10 may be driven if a temperature, detected by a not-shown temperature sensor disposed inside the heating cavity 4, rises to a preset temperature or above.

The controller 13 drives the magnetron 11 on an instruction, which the key 7 receives, to start cooking.

The door 2 opens and closes when the user operates (e.g., presses or touches) an open-close button functioning as the key 7 on the operation panel 3. Specifically, when the open-close button is operated with the door 2 closed, the controller 13 receiving a control signal drives the drawer motor 9 to open the door 2. Meanwhile, when the open-close button is operated with the door 2 open, the controller 13 receiving a control signal drives the drawer motor 9 to close the door 2. Hence, the user usually operates the open-close button to open and close the door 2.

In a case where, for example, a hand of the user is dirty, the user would not like to touch the open-close button (would hesitate to operate the open-close button). In order to cope with a case where user himself or herself cannot operate the open-close button for properly opening the door 2, the heating cooker 101 according to this embodiment has a function of opening the door 2 without the operation of the open-close button by the user himself or herself. Described below is the function to open the door 2 without operation of the open-close button.

Open Control of Door 2

As to the heating cooker 101 according to this embodiment, the door 2 opens when the proximity sensor 5 detects a motion of the user in front of the heating cooker 101 (within a detection area of the proximity sensor 5), the motion involves, for example, waving his or her hand couple of times within a predetermined time period. Described here is a case where the predetermined time period lasts for two seconds, and the motion of the user is to wave his or her hand twice. Note that the predetermined time period shall not be limited to two seconds, and the motion of the user shall not be limited to waving a hand. Moreover, the motion shall not be limited to waving twice.

Figure 3:
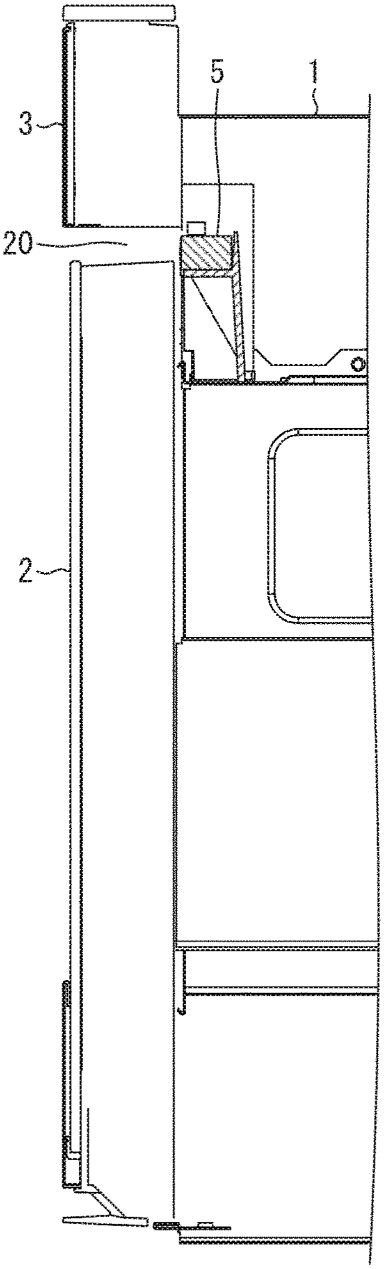
FIG. 3 is a cross-sectional view, observed along arrows A-A in the illustration (a) in FIG. 2.
Figure 4:
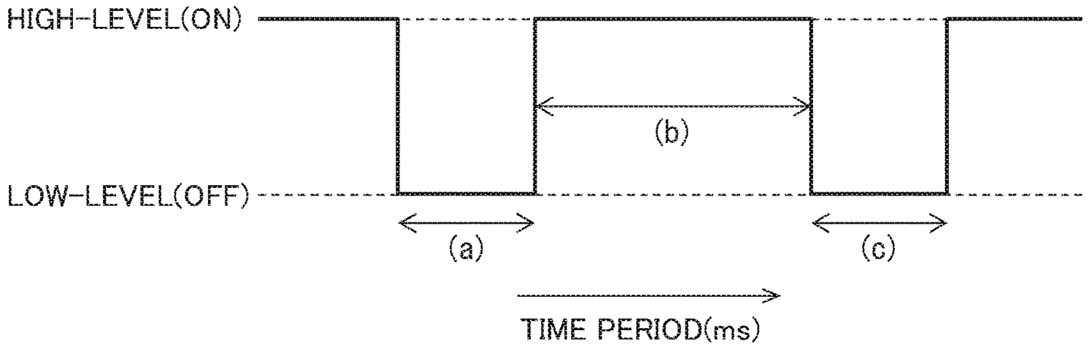
FIG. 4 is an output waveform chart of a detection signal from a proximity sensor for open-close control of the door included in the cooker illustrated in FIG. 1.
Figure 5:
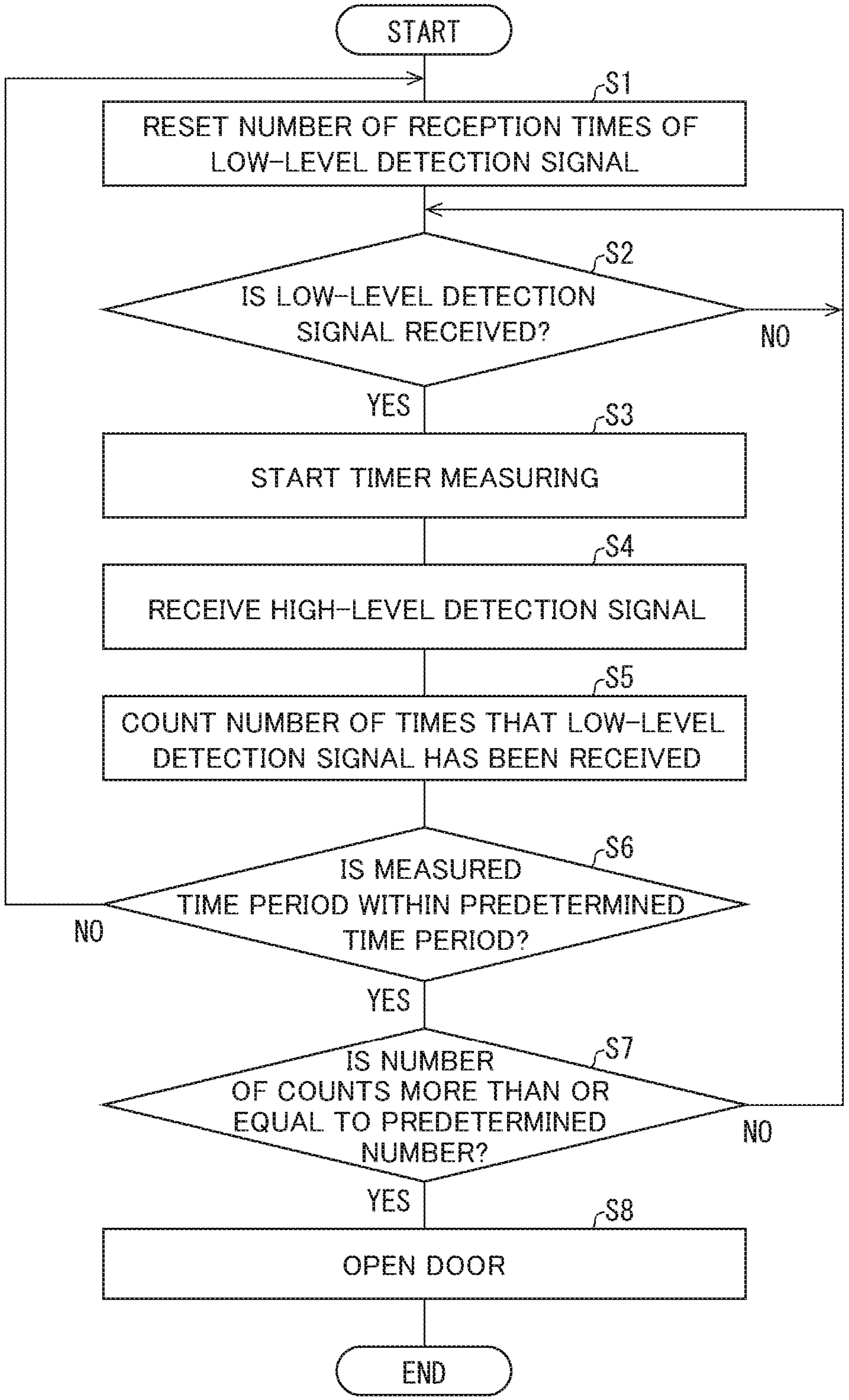
FIG. 5 is a flowchart illustrating a flow of the open-close control of the door included in the cooker illustrated in FIG. 1.

FIG. 3 is a cross-sectional view, observed along arrows A-A in the illustration (a) in FIG. 2. FIG. 4 is an output waveform chart of a detection signal from the proximity sensor 5. FIG. 5 is a flowchart illustrating a flow of the open-close control of the door 2.

As illustrated in FIG. 3, the proximity sensor 5 is disposed in a space (a recess) 20 defined between the operation panel 3 and the door 2, and positioned close to the casing 1. Thanks to this feature, the proximity sensor 5 is not exposed from the front face of the heating cooker 101, and thus is less likely to have an impact from outside the heating cooker 101. The feature contributes to reduction in the risk of failure such as malfunction due to the impact from outside. Moreover, the feature keeps the proximity sensor 5 from accretion of contaminants, contributing to reduction in the risk of, for example, false detection due to the accretion of contaminants. Moreover, the proximity sensor 105 is not exposed from the heating cooker 101, such that the exterior design of the heating cooker 101 is not adversely affected.

The proximity sensor 5 emits an infrared ray in a direction in which the door 2 is pulled out (forward). The proximity sensor 5 outputs (i) a high-level signal while emitting the infrared ray, and (ii) a low-level signal when the emitted infrared ray is reflected on the object to be detected. In other words, when the infrared ray is reflected on a hand of the user within an area irradiated with the infrared ray, the proximity sensor 5 switches the high-level signal to the low-level signal. That is, when the proximity sensor 5 detects the user waving his or her hand twice, the waveform of the output signal appears as illustrated in FIG. 4.

Here, FIG. 4 shows the following periods. A period (a); namely, a low-level period of the output signal (an OFF period), indicates a time period between the start of a first reception of the detection signal and the end of the reception (a time period for continuous reception); that is, a period indicating the detection of the first handwaving. A period (b); namely, a high-level period of the output signal (an ON period), indicates a time period between the end of the first reception of the detection signal and the start of a second reception of the detection signal; that is, a period between the end of the first handwaving and the start of the next handwaving. A period (c); namely, a low-level period of the output signal (an OFF period), indicates a time period between the start of the second reception of the detection signal and the end of the reception (a time period for continuous reception); that is, a period indicating the detection of the second handwaving.

In accordance with the periods (a), (b), and (c) obtained from the proximity sensor 5 and seen in FIG. 4, the controller 13 drives and causes the drawer motor 9 to open the door 2.

The open control of the door 2 is performed according to the flowchart illustrated in FIG. 5. Described here is a control to open the door 2 if a total of the periods (a), (b), and (c) illustrated in FIG. 4 is within two seconds. Note that the open control of the door 2 is performed by the controller 13.

First, the controller 13 resets the number of reception times of a low-level detection signal (Step S1). Here, what is reset is the number of reception times, of the low-level detection signal of the proximity sensor 5, stored in the controller 13.

Next, the controller 13 receives the low-level detection signal from the proximity sensor 5 (Step S2). If the controller 13 determines that the low-level detection signal is received, the process proceeds to Step S3. The controller 13 performs timer measuring. The process proceeds to Step S4. If the controller 13 determines that the low-level detection signal is not received, the process returns to Step S2.

In Step S4, the controller 13 detects reception of the high-level detection signal from the proximity sensor 5.

Then, the controller 13 counts the number of times that the low-level detection signal has been received (Step S5). Here, it is between the reception of the low-level detection signal from the proximity sensor 5 and the reception of the high-level detection signal from the proximity sensor 5 that the controller 13 counts that the low-level detection signal is received once.

In Step S6, the controller 13 determines whether a time period measured in the timer measuring is within a predetermined time period. Here, the measured time period is a duration since the start of the timer measuring in Step S3. The predetermined time period is two seconds. Hence, in Step S6, if the controller 13 determines that the measured time period is within two seconds (Yes), the process proceeds to Step S7. Meanwhile, in Step S6, if the controller 13 determines that the measured time period is not within two seconds (No), the process returns to Step S1.

Then, the controller 13 determines whether the number of counts is more than or equal to a predetermined number (Step S7). Described here is controlling the door 2 to open when the user waves his or her hand twice. Hence, the controller 13 determines whether the number of counts is two or more. If the controller 13 determines that the number of counts is fewer than two (Step S7: No), the process returns to Step S2 again. Meanwhile, if the controller determines that the number of counts is two or more (Step S7: Yes), the process proceeds to Step S8. The controller 13 opens the door 2.

In the above control, the door 2 can be opened by the user waving his or her hand twice within the predetermined time period of two seconds. In other words, if the user does not wave his or her hand twice within two seconds, the door 2 does not open.

Note that the opened door 2 closes when the user operates an operation button functioning as the key 7 of the operation panel 3. However, when closing the opened door 2, the user may use the same motion as that for opening the door 2; that is, the user may wave his or her hand twice within a predetermined time period (e.g., two seconds).

Advantageous Effects

As to the heating cooker 101 in the above configuration, the door 2 is open only when the low-level detection signal from the proximity sensor 5 is received twice or more within a predetermined time period (two seconds). Hence, the door 2 is not open unless the low-level detection signal from the proximity sensor 5 is not received twice or more within two seconds. As can be seen, when many factors are incorporated as conditions to open the door 2, the door 2 can be kept from unnecessarily opening.

In other words, in order to open the door 2 of the heating cooker 101, the user has to wave his or her hand twice or more within two seconds in the detection area of the proximity sensor 5. The door 2 does not open unless these conditions are not satisfied. In addition, the motion of waving a hand twice or more indicates that the user intends to open the door 2. Hence, the door 2 of the heating cooker 101 opens with intension of the user. Such a feature makes it possible to keep the door 2 of the heating cooker 101 from opening unless the user intends to open the door 2.

The feature makes it possible to open the door 2 of the heating cooker 101 with the intension of the user, improving its usability for the user. Furthermore, the door 2 of the heating cooker 101 does not inadvertently open, making it possible to keep the door 2 from opening due to false detection (opening the door 2 against the intention of the user).

Note that, in this embodiment, the condition for the open control of the door 2 is that the user waves his or her hand twice within a predetermined time period (two seconds in this embodiment). If the user cannot wave his or her hand twice within two seconds, the door 2 is controlled not to open. Other conditions may be additionally included for the open control of the door 2 to further reduce the chance of the door 2 opening due to false detection. These conditions are described in second and third embodiments.

Second Embodiment

Described below is another embodiment of the present invention. For the sake of descriptions, identical reference signs are used to denote identical or substantially identical features in functions between the first and second embodiments. These features will not be elaborated upon.

This embodiment and the first embodiment share the basic open control of the door 2. Described is an example of an additional condition in which the door 2 is not open if a time period for continuously receiving a low-level detection signal from the proximity sensor 5 is as long as a predetermined time period or longer. Here, the time period for continuously receiving the low-level detection signal is a time period between the start and the end of the reception of the low-level detection signal from the proximity sensor 5 (a low-level period). The condition to be added in this embodiment is to keep the door of the heating cooker 101 from opening when, for example, a person passes by in front of the heating cooker 101.

The respective OFF periods; namely, the periods (a) and (c) in FIG. 4 (low-level periods) are the continuous reception time periods. Typically, when a person passes through a detection area of the proximity sensor 5, the OFF period lasts 300 ms or longer. In this embodiment, if the continuous reception time period lasts as long as 250 ms or longer, the person is assumed to pass through the detection area of the proximity sensor 5. Hence, the door 2 is kept from opening.

Open Control of Door 2

Figure 6:
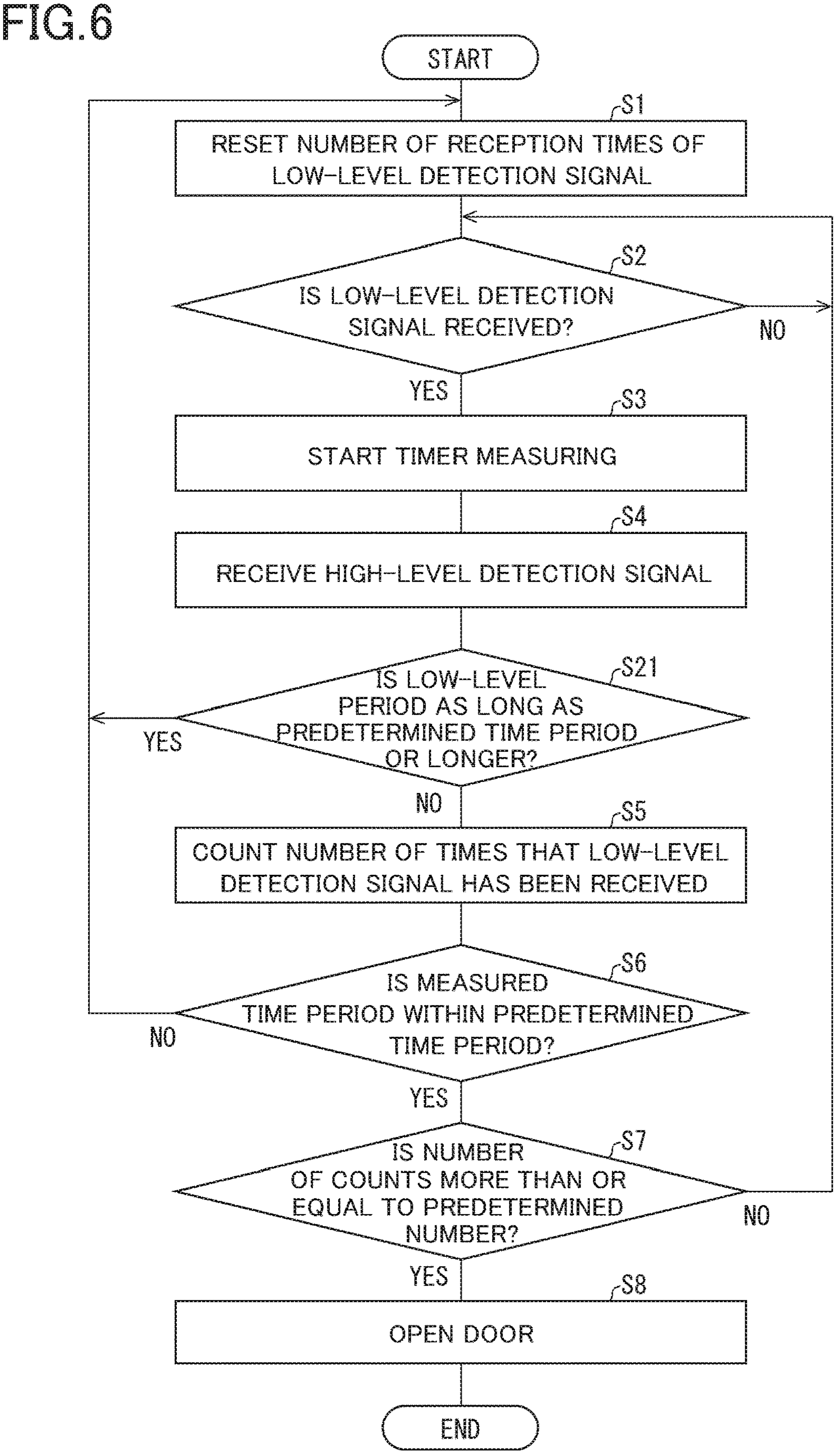
FIG. 6 is a flowchart illustrating a flow of open-close control of a door included in a cooker according to a second embodiment of the present invention.

FIG. 6 is a flowchart illustrating a flow of open control of the door 2 included in the cooker 101 according to this embodiment. Here, Steps S1 to S8 in FIG. 6 are the same as Steps S1 to S8 in FIG. 5 of the first embodiments. Hence, detailed descriptions thereof shall be omitted.

As shown in FIG. 6 in this embodiment, Step S21 is added between Steps S4 and S5.

In Step S21, the controller 13 determines whether the low-level period is as long as a predetermined time period or longer. Here, the low-level period is a time period for continuously receiving the low-level detection signal from the proximity sensor 5 (a time period between S2 and S4). That is, if the user waves his or her hand once, the low-level period is a time period for waving the hand once.

In Step S21, if the controller 13 determines that the low-level period is as long as the predetermined time period (i.e., 250 ms) or longer (Yes), the process returns to Step S1. The controller 13 starts the open control of the door 2 again from the beginning.

Meanwhile, in Step S21, if the controller 13 determines that the low-level period is not within the predetermined time period (No), the process proceeds to Step S5. The controller 13 continues the open control of the door 2.

Note that the opened door 2 closes when the user operates an operation button functioning as the key 7 of the operation panel 3. However, when closing the opened door 2, the user may use the same motion as that for opening the door 2; that is, the user may wave his or her hand twice within a predetermined time period (e.g., two seconds).

Advantageous Effects

As can be seen, added Step S21 can keep the door 2 from opening if the time period for continuously receiving the low-level detection signal from the proximity sensor 5 (the OFF period) is as long as the predetermined time period or longer. Such a feature makes it possible to keep the door 2 of the heating cooker 101 from opening if detected near the heating cooker 101 is a slow motion observed when, for example, a person passes by in front of the heating cooker 101. Note that, in this embodiment, a criterion in Step S21 for the predetermined time period is 250 ms. However, the predetermined time period shall not be limited to 250 ms.

Third Embodiment

Described below is another embodiment of the present invention. For the sake of descriptions, identical reference signs are used to denote identical or substantially identical features in functions between the above embodiments and a third embodiment. These features will not be elaborated upon.

This embodiment and the first embodiment share the basic open control of the door 2. Described is an example in which the door 2 is not open if a time period between the end of a first reception of a low-level detection signal and the start of a second reception of the low-level detection signal (the period (b) in FIG. 4; namely, a high-level period (an ON period)) is shorter than a predetermined time period (100 ms). For example, the door 2 is not open if the high-level period; that is, if a time period between the end of the first operation and the start of the second operation is shorter than expected, the door 2 is kept from opening even if the high-level period is within the predetermined time period (two seconds).

In this embodiment, assumed as an example of a short high-level period (an ON period) is a case where a user waves his or her hand with the fingers open. In this case, the intervals between the fingers are short. Hence, the time period between the end of the reception of the low-level detection signal and the start of the next reception of the low-level detection signal (an ON period) is no longer than 100 ms.

Open Control of Door 2

Figure 7:
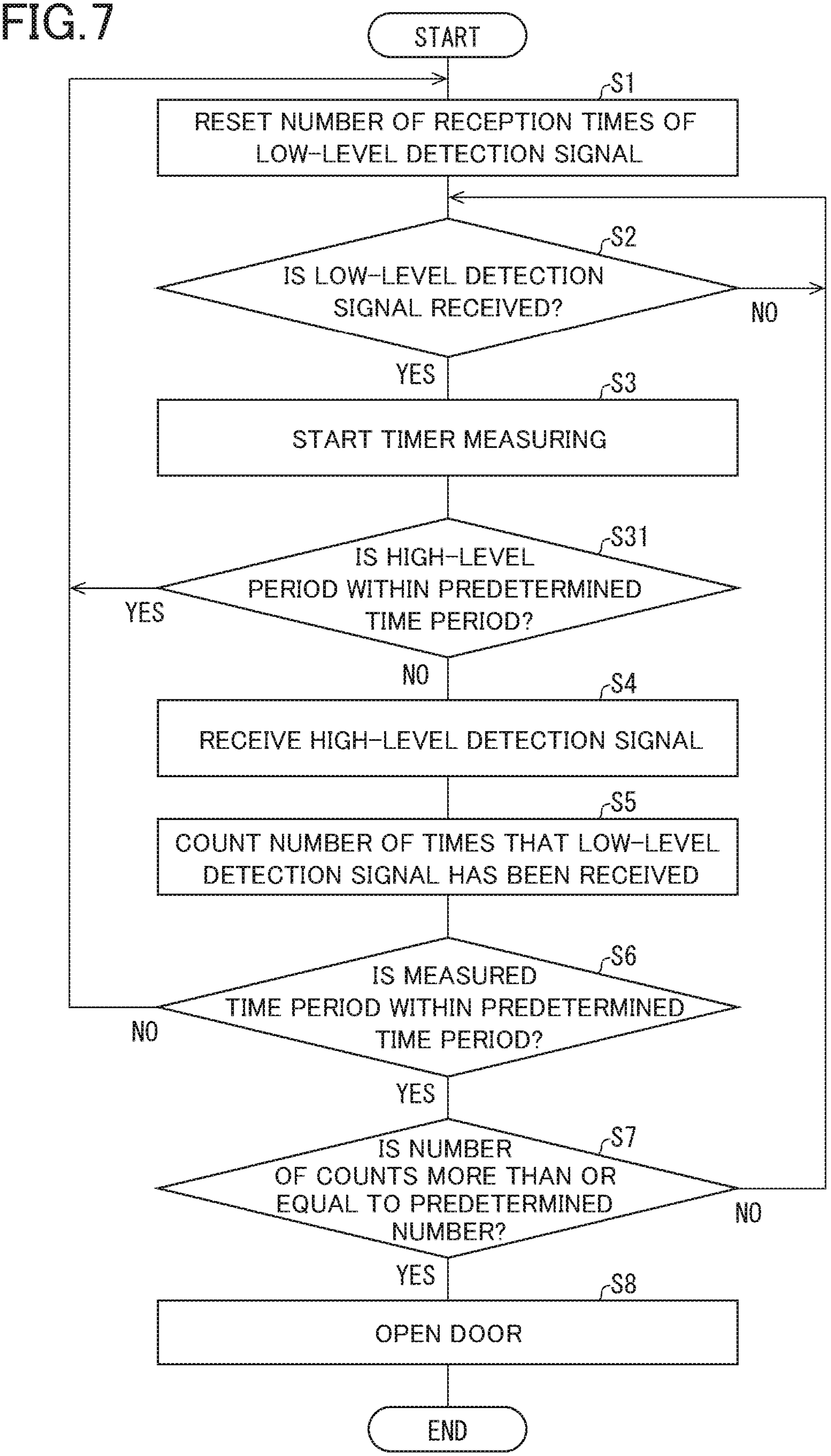
FIG. 7 is a flowchart illustrating a flow of open-close control of a door included in a cooker according to a third embodiment of the present invention.

FIG. 7 is a flowchart illustrating a flow of open control of the door 2 included in the cooker 101 according to this embodiment. Here, Steps S1 to S8 in FIG. 7 are the same as Steps S1 to S8 in FIG. 5 of the first embodiments. Hence, detailed descriptions thereof shall be omitted.

As shown in FIG. 7 in this embodiment, Step S31 is added between Steps S3 and S4.

In Step S31, the controller 13 determines whether the high-level period is within a predetermined time period. Here, the high-level period is a time period between the end of the first reception of the low-level detection signal and the start of the second reception of the low-level detection signal (an ON period). That is, if the user waves his or her hand, a time period between first handwaving and second handwaving is the high-level period.

In Step S31, if the controller 13 determines that the high-level period is within the predetermined time period (i.e., 100 ms) (Yes), the process returns to Step S1. The controller 13 starts the open control of the door 2 again from the beginning.

Meanwhile, in Step S31, if the controller 13 determines that the high-level period is not within the predetermined time period (No), the process proceeds to Step S5. The controller 13 continues the open control of the door 2.

Note that the opened door 2 closes when the user operates an operation button functioning as the key 7 of the operation panel 3. However, when closing the opened door 2, the user may use the same motion as that for opening the door 2; that is, the user may wave his or her hand twice within a predetermined time period (e.g., two seconds).

Advantageous Effects

As can be seen, added Step S31 can keep the door 2 from opening if the time period between the end the reception of the low-level detection signal from the proximity sensor 5 and the start of the next reception of the low-level detection signal (the ON period) is within the predetermine time period. Such a feature makes it possible to keep the door 2 of the heating cooker 101 from opening if detected is a motion in which the ON period is extremely short, such as a case where a person waves his or hand, with the fingers open, in front of the heating cooker 101. Note that, in this embodiment, a criterion in Step S31 for the predetermined time period is 100 ms. However, the predetermined time period shall not be limited to 100 ms.

In the above first to third embodiments, the heating cooker is exemplarily described as a cooker with a door of the present invention. However, the present invention shall not be limited to a heating cooker. Alternatively, the present invention may be a warmer with a door as long as the warmer is a cooker with a door. Moreover, the present invention may be a cooker with another door.

Modifications

In the first to third embodiments, the proximity sensor 5 emits an infrared ray, and outputs: an OFF detection signal if an object to be detected is within a predetermined distance from the heating cooker 101; and an ON detection signal if the object to be detected is not within the predetermined distance from the heating cooker 101. However, a sensor of the present invention shall not be limited to such a proximity sensor 5.

For example, the sensor may detect a distance between an object approaching the heating cooker 101 and the heating cooker 101. In such a case, the door 2 of the heating cooker 101 may be controlled not to open unlike the above embodiments unless the distance between the heating cooker 101 and the object to be detected is within a predetermined distance even if the object is within a detection area of the sensor. Even if the user is within the detection area of the proximity sensor 5, for example, such a feature makes it possible to keep the door 2 from opening even if the user waves his or her hand twice if the user is apart from the heating cooker 101 (as far as a predetermined distance away or greater). Even if the various conditions described in the first to third embodiments are satisfied, such a feature makes it possible to keep the door 2 from opening if the user is away from the heating cooker 101 more than necessary.

Software Implementation

Control blocks (in particular, the controller 13) of the heating cooker 101 may be implemented in the form of a logic circuit (hardware) formed on, for example, an integrated circuit (an IC chip), or of software.

In the latter case, the heating cooker 101 includes a computer executing an instruction of a program that is software implementing various functions. This computer includes, for example, at least one processor (a control apparatus), and at least one computer-readable storage medium storing the above program. The processor in the computer then retrieves and runs the program contained in the storage medium, thereby achieving the object of the present invention. The processor may be, for example, a CPU (central processing unit). The storage medium may be a "non-transitory, tangible medium" such as a ROM (read-only memory), a tape, a disc/disk, a card, a semiconductor memory, or programmable logic circuitry. The storage medium may further include, for example, a random access memory (RAM) for loading the programs. The programs may be supplied to the computer via any transmission medium (e.g., over a communications network or by broadcasting waves) that can transmit the programs. The present invention, in an aspect thereof, encompasses data signals on a carrier wave that are generated during electronic transmission of the programs.

SUMMARY

A cooker according to a first aspect of the present invention is a cooker (the heating cooker 101) with the door 2. The heating cooker 101 includes: a proximity sensor 5 detecting presence or absence of an object in proximity to the heating cooker 101; and a door opening controller (the controller 13) controlling the door 2 to open and close on a detection signal (the low-level detection signal) from the proximity sensor 5, wherein the door opening controller (the controller 13) opens the door 2 when receiving the detection signal (the low-level detection signal) from the proximity sensor 5 twice or more within a predetermined time period, the detection signal (the low-level detection signal) indicating the presence of the object.

In the above configuration, the door is open if the controller receives a detection signal twice or more within a predetermined time period, the detection signal indicating the presence of the object. The door is kept from opening if such a condition of opening the door is not satisfied.

As can be seen, when many factors are incorporated as conditions to open the door, the door can be kept from unnecessarily opening. For example, in opening the door with the motion of the user waving his or her hand within a detection area of the proximity sensor, the door can be opened by the user waving the hand twice or more within a predetermined time period. That is, the door is kept from opening unless the user waves his or her hand twice or more within the predetermined time period.

Such features achieve advantageous effects capable of providing a cooker whose door is kept from opening unless the user intends to open the door.

In the cooker, of a second aspect of the present invention, according to the first aspect, the door opening controller (the controller 13) may keep the door 2 from opening if a time period for continuously receiving the detection signal (the low-level detection signal) lasts as long as a predetermined time period or longer.

In the above configuration, the door opening controller keeps to door from opening if the time period for continuously receiving the detection signal lasts as long as the predetermined time period or longer. Such a feature makes it possible to keep the door of the heating cooker from opening if detected near the heating cooker is a slow motion observed when, for example, a person passes by in front of the heating cooker.

In the cooker, of a third aspect of the present invention, according to the first aspect or the second aspect, the door opening controller (the controller 13) may preferably keep the door 2 from opening if a time period between an end of the reception of the detection signal (the low-level detection signal) and a start of a next reception of the detection signal (the low-level detection signal) is within a predetermined time period.

In the above configuration, the door opening controller keeps the door from opening if a time period between the end of the reception of the detection signal and the start of the next reception of the detection signal is within the predetermined time period. Such a feature makes it possible to keep the door of the heating cooker from opening if detected near the cooker is a quick motion, such as a case where a person waves his or hand with the fingers open in front of the heating cooker.

In the cooker, of a fourth aspect of the present invention, according to any one of the first to third aspects, the proximity sensor 5 may preferably be disposed in a recess (the space 20) formed on a front face of the cooker (the heating cooker 101), and opening in a direction that the proximity sensor 5 faces for the detection.

In the above configuration, the proximity sensor is disposed in a recess formed on a front face of the cooker, and opening in a direction that the proximity sensor faces for the detection. Hence, the proximity sensor is not exposed from the front face of the cooker. Thanks to this feature, the proximity sensor is less likely to have an impact from outside, making it possible to reduce the risk of failure such as malfunction due to the impact from outside. Moreover, the feature keeps the proximity sensor from accretion of contaminants, contributing to reduction in the risk of, for example, false detection due to the accretion of contaminants. In addition, the proximity sensor is not exposed from the heating cooker, such that the exterior design of the heating cooker is not adversely affected.

The cooker, of a fifth aspect of the present invention, according to any one of the first to fourth aspects, may further include a heating apparatus heating an article to be cooked inside a cooking cavity.

The present invention shall not be limited to the embodiments described above, and can be modified in various manners within the scope of claims. The technical aspects disclosed in different embodiments are to be appropriately combined together to implement an embodiment. Such an embodiment shall be included within the technical scope of the present invention. Moreover, the technical aspects disclosed in each embodiment are combined to achieve a new technical feature.

The invention claimed is:

1. A cooker with a door, the cooker comprising:

a proximity sensor configured to detect presence or absence of an object in proximity to the cooker; and a door opening controller configured to control the door to open and close based on a detection signal from the proximity sensor, wherein the door opening controller opens the door upon detecting a plurality of status changes within a first predetermined time period based on the detection signal, each one of the plurality of status changes is defined as a level change, from a first level to a second level, in the detection signal, the first level indicating the presence of the object, the second level indicating the absence of the object, and the door opening controller keeps the door from opening if a time period for continuously receiving the detection signal on the first level lasts as long as a second predetermined time period or longer.

2. The cooker according to claim 1, wherein the door opening controller keeps the door from opening if a time period between an end of the reception of the detection signal on the first level and a start of a next reception of the detection signal on the first level is within a third predetermined time period.

3. The cooker according to claim 1, wherein the proximity sensor is disposed in a recess formed on a front face of the cooker, and opening in a direction that the proximity sensor faces for the detection.

4. The cooker according to claim 1, further comprising a heating apparatus configured to heat an article to be cooked inside a cooking cavity.

* * * * *